Figure 1:
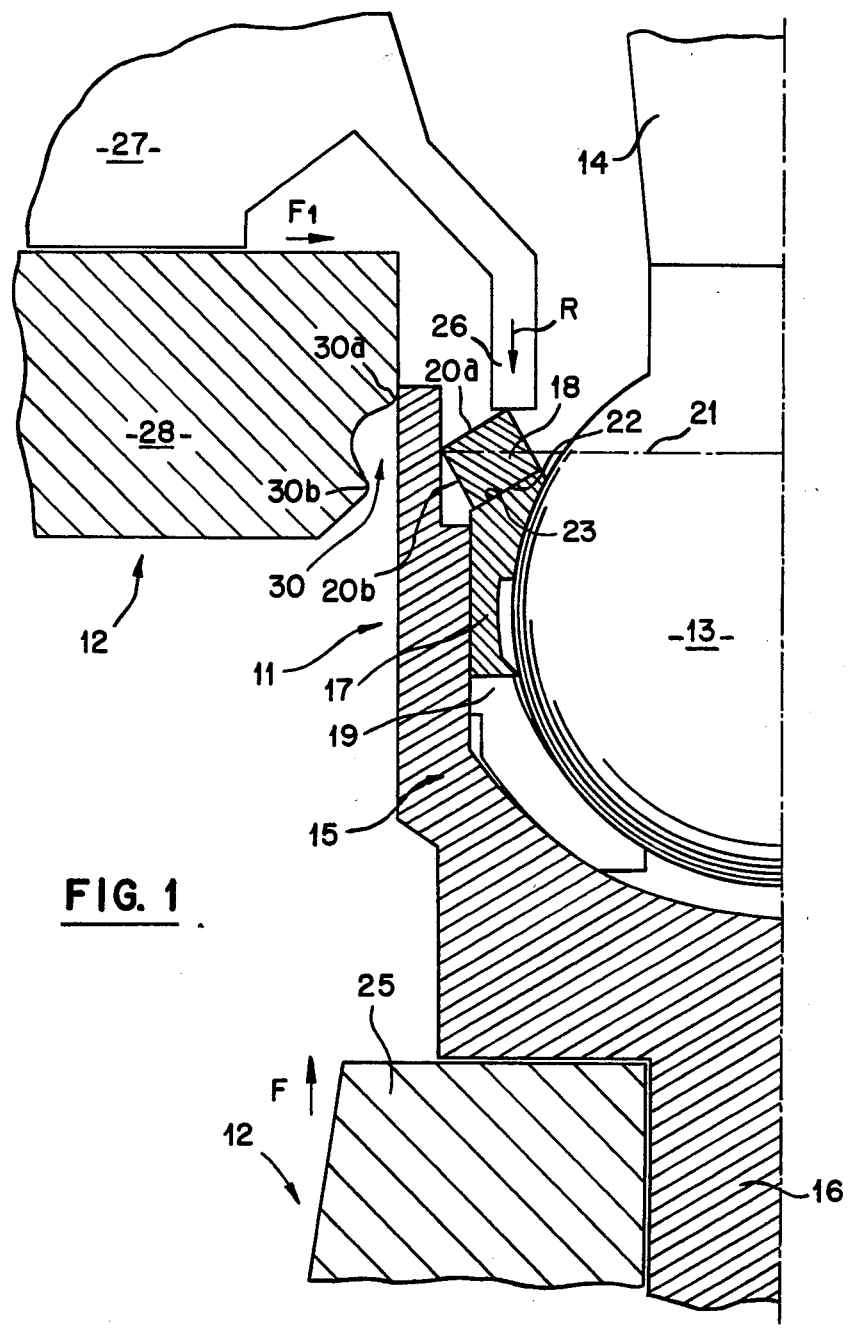

United States Patent [19]

Morin

[11] Patent Number: 4,559,692
[45] Date of Patent: Dec. 24, 1985

[54] METHOD AND APPARATUS FOR THE MANUFACTURE OF A BALL JOINT

[75] Inventor: Gérard Morin, Conde Sainte Libiaire, France

[73] Assignee: Societe Anonyme D.B.A., Paris, France

[21] Appl. No.: 561,755

[22] Filed: Dec. 15, 1983

Related U.S. Application Data

[62] Division of Ser. No. 342,297, Jan. 25, 1982, Pat. No. 4,504,166.

[30] Foreign Application Priority Data

Jan. 23, 1981 [FR] France ................. 81 01259

[51] Int. Cl.⁴ .............. B23P 11/00; B23P 19/04; B21D 53/10
[52] U.S. Cl. .............. 29/441 R; 29/149.5 B; 29/243.52; 29/511; 29/725; 29/DIG. 3; 72/402; 403/140
[58] Field of Search .......... 29/149.5 B, 243.5, 243.52, 29/283.5, 441, 509, 510, 511, 724, 725, DIG. 3; 72/402; 403/140, 143, 135

[56] References Cited

U.S. PATENT DOCUMENTS

| 2,308,968 | 1/1943 | Gregory ................. 29/511 |
| 2,768,725 | 10/1956 | Foulds et al. ............ 29/511 X |
| 2,904,874 | 9/1959 | Norton ................. 29/149.5 B |
| 3,241,226 | 3/1966 | Jorgji ................. 29/149.5 B X |
| 3,253,845 | 5/1966 | Davies ................. 29/149.5 B X |
| 3,413,023 | 11/1968 | Herbenar ................. 403/135 |
| 3,662,462 | 5/1972 | Shiflet ................. 29/149.5 B |
| 3,679,248 | 7/1972 | Herbenar ................. 403/140 |
| 3,736,635 | 6/1973 | Romer et al. ............ 29/149.5 B |
| 3,849,009 | 11/1974 | Bourdon ................. 403/133 |
| 3,986,250 | 10/1976 | Belsdorf ................. 29/511 |
| 4,089,095 | 5/1978 | Becker ................. 29/149.5 B |
| 4,283,833 | 8/1981 | Pyles ................. 403/140 X |
| 4,286,363 | 9/1981 | Morin ................. 29/149.5 B |
| 4,318,627 | 3/1982 | Morin ................. 403/140 X |
| 4,353,660 | 10/1982 | Parks ................. 403/135 X |

FOREIGN PATENT DOCUMENTS

| 2510171 | 9/1976 | Fed. Rep. of Germany . |
| 1523060 | 8/1968 | France . |
| 2446694 | 8/1968 | France . |

Primary Examiner—Howard N. Goldberg
Assistant Examiner—Ronald S. Wallace
Attorney, Agent, or Firm—Larry J. Palguta; Ken C. Decker

[57] ABSTRACT

Method of crimping the locking ring of a ball joint. According to the invention, a prestress is applied to the bearing bush (17) to obtain a certain frictional torque between the latter and the spherical pivot while the locking ring (18) is placed on the bush (17); the punching tools (28) comprising a double die (30) are then actuated simultaneously in the direction of the socket (15) so as to deform the latter along two approximately circumferential and parallel zones located on both sides of the ring (18) to surround it without displacing it.

8 Claims, 2 Drawing Figures

METHOD AND APPARATUS FOR THE MANUFACTURE OF A BALL JOINT

This is a division of application Ser. No. 342,297, filed Jan. 25, 1982, now U.S. Pat. No. 4,504,166 issued Mar. 12, 1985.

The invention concerns a method and an apparatus for the manufacture of a ball joint as well as a ball joint obtained by employing this method.

A ball joint of the type with which the invention is concerned includes a spherical pivot extended by a rod, a socket or ball joint body which is approximately cylindrical, accommodating the pivot and extended by a further rod, as well as a resilient grip bearing bush interposed between the pivot and the inner wall of the socket. A locking ring is fixed in the socket to act as a stop for the bush and retain it with a certain prestress applied according to a predetermined direction. The prestress determines the gripping force between the bush and the spherical pivot, that is, the rigidity of the joint. The locking ring is most often fixed in the socket by crimping, that is, by deforming the wall of said socket. Difficulties have been ascertained, particularly at the stage of mass production, for obtaining ball joints with a joint rigidity of the desired value. In fact, to a given prestress applied to the bush before fixing the locking ring corresponds a certain position of said bush within the socket. But crimping of the ring in contact with this bush may be accompanied by a displacement of said ring and hence a modification of the prestress applied to the bush.

The object of the invention is to eliminate this disadvantage and, consequently, to improve the reproducibility of the mechanical characteristics of mass produced ball joints.

With this object, the invention concerns firstly a method of manufacturing a ball joint including a spherical pivot, a metal socket accommodating said pivot, a resilient grip bearing bush interposed between said pivot and said socket and a locking ring fixed in the socket to retain said bush with a prestress applied according to a predetermined direction, characterized in that it consists in exerting a predetermined gripping prestress on said bush and radially inwardly deforming the portion of the wall of said socket located in the vicinity of said ring along two circumferential action zones located on both sides of said ring until at least the radially outermost portion of the latter is surrounded.

The invention likewise concerns a machine for the manufacture of a ball joint particularly for employing the method defined above, of the type including a support for a metal socket, a stop for positioning a locking ring of said socket, said support and said stop being displaceable relaive to each other according to a predetermined direction, and several crimping tools mounted on the same frame as said positioning stop, distributed around a location reserved for said socket and subject to displacement towards this location, characterized in that each tool exhibits a double die of which the two active portions are parallel and spaced apart so as to deform said socket approximately radially inwardly and on both sides of the location of said ring defined by said positioning stop.

Finally, the invention concerns any ball joint of the type defined above and characterized in that the wall of said socket located in the vicinity of said ring is deformed radially inwardly along two approximately circumferential, approximately parallel zones located respectively on both sides of said ring to surround at least the radially outermost portion of the latter.

Figure 2:
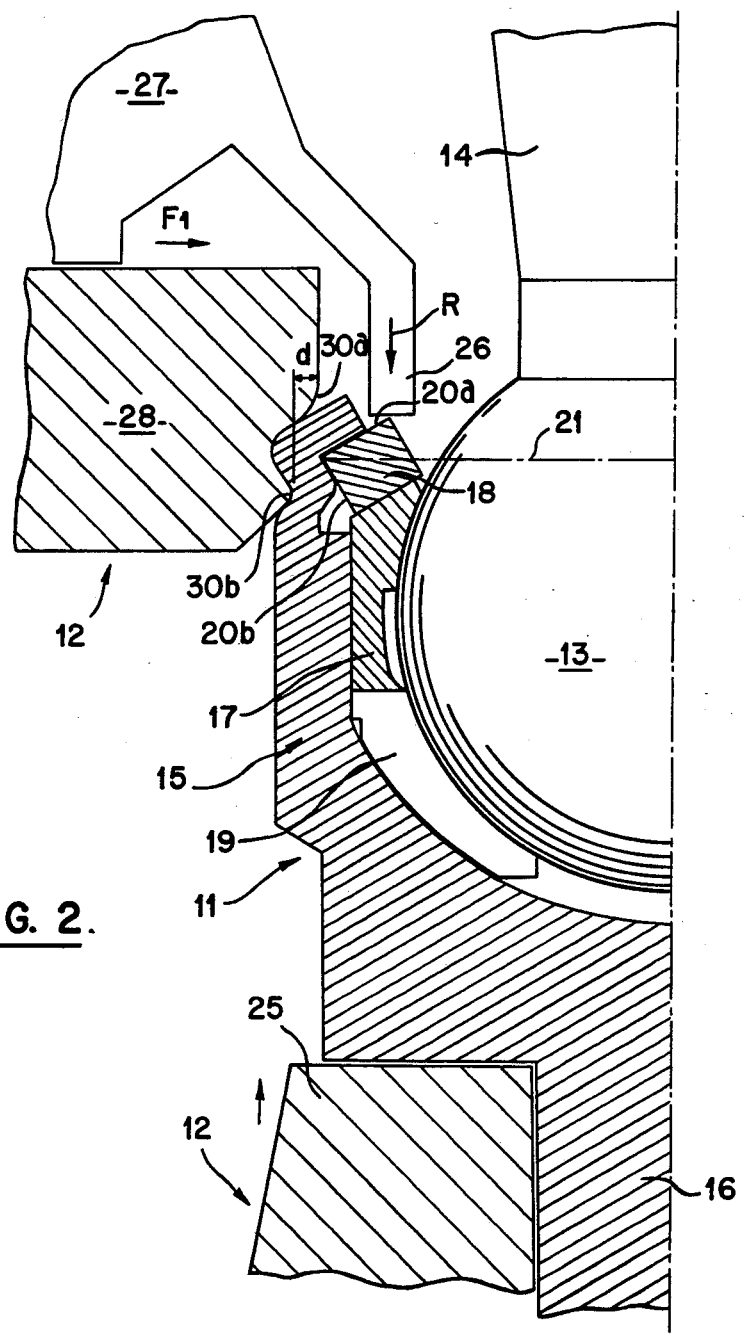

The invention will be understood better and further advantages thereof will appear better in the light of the description which will follow of a machine according to the invention, for the manufacture of a ball joint, as well as of the mode of operation of this machine, given solely by way of example and made with reference to the attached drawings in which:

FIG. 1 shows a half-section of a machine according to the invention on which have been placed the constituent parts of a ball joint; and FIG. 2 is a view similar to FIG. 1 illustrating an operation of crimping the locking ring of this ball joint.

Referring more particularly to FIG. 1, the constituent parts of the ball joint 11 which is on the point of being assembled on the machine 12 are: a spherical pivot 13 extended by a rod 14, an approximately cylindrical metal socket 15, extended by a further rod 16 and comprising an open tubular portion accommodating the pivot 13, a resilient grip bearing bush 17, for example of plastic material, and a locking ring 18. The bush 17, shaped internally to exhibit a certain area of contact with the pivot 13, is interposed between the latter and the inner wall of the socket 15. It is provided with a certain number of slots 19 extending over its lower portion and distributed regularly. This structure therefore allows it to contract under the effect of a force tending to push it back towards the bottom of the socket and consequently to pinch the spherical pivot more or less so as to give the whole of the joint a certain rigidity or frictional torque. The locking ring 18 comprises in the embodiment described two adjacent external frustoconical surfaces 20a and 20b, intersecting in a plane 21 perpendicular to the direction along which is to be exerted a force R for generating a desired gripping prestress at the level of the bush 17, as will be explained below. In practice, a ring of such shape is obtained by prior central stamping of a ring in the form of a tubular portion. The ring 18 rests by a further frustoconical surface 22 on a corresponding frustoconical portion 23 of the bush 17.

The machine 12 comprises a support 25 for the socket 15 and a positioning stop 26, in the form of a collar, for giving the locking ring 18 a positional reference with which it can come back into contact. The support 25 is movable in the direction of the stop 26 according to the arrow F, to generate a reaction force R mentioned above, exerted on the bush 17 via the ring 18 and determining the gripping prestress of the bush 17. The stop 26 is integral with a frame 27 on which are also mounted in sliding relationship several crimping tools 28 distributed regularly around the location reserved for the socket 15 and at the level of the position provided for the ring 18. Each crimping tool 28 embraces a certain angular sector of action, for example of the order of 60° in the case of six crimping tools being provided, in order for the crimping operation to be effected simultaneously and uniformly all around the periphery of the socket 15. The tools 28 are subjected to radial inward displacement (according to the direction of the arror $F_1$), that is, towards said location reserved for the socket 15.

According to an important characteristic of the invention, each tool exhibits a double die 30 of which the two active portions 30a, 30b, protruding in the direction of the location of the socket 15, are parallel and spaced apart so as to deform the socket approximately radially inwards and on both sides of the location of the ring 18, this location being defined with precision relative to the die 30 since there is contact between the ring 18 and the stop 26, as the latter is integral with the frame for the tools 28.

The crimping operation resulting in final assembly of the constituent parts of the ball joint is effected in the following manner:

The socket 15 containing the pivot 13, the bush 17 and the ring 18 is placed on its support 25. The latter is displaced in the direction of the frame 27 until the stop 26 comes into contact with the ring 18 and induces, via the latter, a certain thrusting of the bush 17 in the socket which is manifested by a certain gripping prestress between the pivot 13 and the bush. When the whole of the joint is provided with a desired rigidity or frictional torque, the support 25 is fixed and will be maintained in this position until the end of the process. The situation is at this moment as shown in FIG. 1. Crimping is then completed by controlling simultaneous displacement of all the tools 28 radially (direction of the arrow $F_1$) in the direction of the socket 15. The two active portions 30a, 30b then deform the wall of the socket 15 along two annular action zones located on each side of the plane 21, until the frustoconical surfaces 20a, 20b of the ring 28 are surrounded. It has been ascertained that this mode of crimping is not manifested by any perceptible force on the ring 18. The latter therefore keeps the position which was assigned to it at the moment of positioning of the constituent parts of the ball joint. It therefore cannot modify in any way the prestress applied to the bush 17. The result is that which is illustrated in FIG. 2. It is to be noted that the radical distance d between the two active portions 30a, 30b depends on the shape of the ring 18 and in particular on the inclination of the frustoconical surfaces 20a and 20b relative to the plane 21. By way of example, the distance d is zero when the inclination of each frustoconical surface is 45° relative to the plane 21.

I claim:

1. A method of manufacturing a ball joint having a metal socket and comprising a tubular end wall portion having a longitudinal axis, a spherical pivot accommodated within said socket, a resilient grip bearing bush interposed between said socket and pivot and having an annular end portion, and a locking ring having a peripheral outer radial edge with converging outer surfaces and fixed in said socket in contact engagement with said annular end portion of said bush to retain the bush in the socket with a preload force, the method comprising the steps of:
   exerting on said bush a predetermined preload force directed parallel to said axis, and
   exerting, on at least one crimping location of said end wall portion, two radially inwardly directed deformation forces onto two associated axially spaced-apart portions of said end wall portion so that said outer radial edge is surrounded by radially inwardly deformed material of said end wall portion and the deformed material engaging the converging outer surfaces.

2. The method of claim 1, further comprising the steps of providing said annular end portion of said bearing bush and said locking ring with complementary frusto-conical surfaces, and providing said locking ring with the outer surfaces converging radially outwardly toward a plane perpendicular to said axis, said two associated axially spaced-apart portions located axially on both sides of said plane.

3. The method of claim 2 wherein said deformation forces are exerted by a radially displaceable tool having two axially offset and radially protruding die portions.

4. The method of claim 3 wherein said die portions of said radially displaceable tool are radially offset one relative to the other.

5. A machine for carrying out the method of claim 1, which comprises:
   a support for supporting said metal socket,
   a tubular stop positioned along side said longitudinal axis and adapted for bearing engagement with said locking ring positioned on said annular end portion of said bearing bush accommodated in said socket, said support and said stop displaceable one relative to the other in a direction parallel to said longitudinal axis, and at least one tool adjacent said stop and displaceable perpendicularly relative to said axis and having two axially offset and radially protruding die portions.

6. The machine of claim 5 wherein said die portions of said tool are radially offset one relative to the other.

7. The machine of claim 5 wherein said stop is stationary.

8. A method of manufacturing a ball joint having a metal socket and comprising a tubular end wall portion having a longitudinal axis, a spherical pivot accommodated within said socket, a resilient grip bearing bush interposed between said socket and pivot and having a frusto-conical end bearing surface, and a locking ring having a pair of frusto-conical outer surfaces converging outwardly toward a plane transverse to said axis and a frusto-conical end bearing surface in contact engagement with the frusto-conical end bearing surface of the bush to retain the bush in the socket with a preload force, the method comprising the steps of:
   exerting on said bush a predetermined preload force directed parallel to said axis; and
   exerting, on at least one crimping location of said end wall portion, two radially inwardly directed deformation forces onto two associated axially spaced-apart portions of said end wall portion so that said axially spaced-apart portions are deformed radially inwardly to surround at least a radially outermost portion of said ring.

* * * * *